United States Patent
Hiertz et al.

(10) Patent No.: US 8,331,396 B2
(45) Date of Patent: Dec. 11, 2012

(54) METHOD OF CONGESTION MANAGEMENT IN A WIRELESS MESH NETWORK

(75) Inventors: Guido Roland Hiertz, Aachen (DE); Bernard Walke, Wuerselen (DE); Theodorus Jacobus Johannes Denteneer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 287 days.

(21) Appl. No.: 12/521,882

(22) PCT Filed: Jan. 10, 2008

(86) PCT No.: PCT/IB2008/050070
§ 371 (c)(1), (2), (4) Date: Jul. 1, 2009

(87) PCT Pub. No.: WO2008/084450
PCT Pub. Date: Jul. 17, 2008

(65) Prior Publication Data
US 2010/0034091 A1 Feb. 11, 2010

(30) Foreign Application Priority Data
Jan. 12, 2007 (EP) .................................. 07300724

(51) Int. Cl.
*H04L 12/413* (2006.01)
(52) U.S. Cl. ......... 370/445; 370/229; 370/461; 370/462
(58) Field of Classification Search .................. 370/278, 370/338, 229–238, 445–462
See application file for complete search history.

(56) References Cited

U.S. PATENT DOCUMENTS

| | | | |
|---|---|---|---|
| 7,693,051 B2 * | 4/2010 | Ozer et al. | 370/229 |
| 7,787,366 B2 * | 8/2010 | Cuffaro et al. | 370/229 |
| 2002/0163933 A1 | 11/2002 | Benveniste | |
| 2004/0170150 A1 | 9/2004 | Guo et al. | |
| 2004/0240426 A1 | 12/2004 | Wu et al. | |

(Continued)

FOREIGN PATENT DOCUMENTS

EP 1255376 A1 11/2002

OTHER PUBLICATIONS

He et al , A Spatiotemporal Communication Protocol for Wireless Sensor Networks, Oct. 205.*

(Continued)

*Primary Examiner* — Michael Thier
*Assistant Examiner* — Vincelas Louis
(74) *Attorney, Agent, or Firm* — Larry Liberchuk

(57) ABSTRACT

A method of congestion management in a wireless mesh network in which the CSMA/CA algorithm is used to access wireless medium, said network comprising a first station and at least one neighboring station able to communicate directly with the first station, comprises: —broadcasting (22) an announcement message by the first station to the at least one neighboring station when the first station experiences a congestion in its environment, said announcement message comprising a congestion level parameter, —activating (26) by the neighboring station, at reception of the announcement message, a congestion state in which the minimum size of the time window, called contention window, to access the medium before transmission of a message is strictly greater than the minimum size (CWmin) defined in absence of congestion, said minimum size in congestion state being defined as a function of the congestion level parameter.

7 Claims, 2 Drawing Sheets

U.S. PATENT DOCUMENTS

| | | | |
|---|---|---|---|
| 2005/0063458 A1* | 3/2005 | Miyake et al. | 375/235 |
| 2005/0094558 A1* | 5/2005 | Lu | 370/229 |
| 2006/0274680 A1* | 12/2006 | Zhu et al. | 370/278 |
| 2007/0076726 A1* | 4/2007 | Weston et al. | 370/401 |
| 2007/0206547 A1* | 9/2007 | Gong et al. | 370/338 |
| 2008/0056125 A1* | 3/2008 | Kneckt et al. | 370/229 |

OTHER PUBLICATIONS

Wang et al: "CSMA/CCA: A Modified CSMA/CA Protocol Mitigating the Fairness Problem for IEEE 802.11 DCF"; Multimedia Services Access Networks, 2005, 2005 1st International Conference, Orlando, FL, Jun. 13-15, 2005, IEEE, pp. 88-95.

Vishnevsky et al: "IEEE 802.11 Wireless LAN: Saturation Throughput Analysis With Seizing Effect Consideration"; Cluster Computing 5, 2002, pp. 133-144.

Bianchi, G.: "Performance Analysis of the IEEE 802.11 Distributed Coordination Function"; IEEE Journal on Selectec Areas in Communications, vol. 18, No. 3, Mar. 2000, pp. 535-547.

* cited by examiner

METHOD OF CONGESTION MANAGEMENT IN A WIRELESS MESH NETWORK

FIELD OF THE INVENTION

The invention relates to the field of wireless mesh network, and more specifically to a method of congestion management in a wireless mesh network in which the CSMA/CA algorithm is used to access the wireless medium.

BACKGROUND OF THE INVENTION

In wireless network, stations share the wireless medium. This leads to competition for the wireless medium, as simultaneous messages can collide. To enable fair sharing, the IEEE802.11 standard has introduced the DCF and EDCA mechanisms in which stations execute the well known CSMA or CSMA/CA algorithms to access the medium. These mechanisms avoid collisions, to some extent, and enable relatively efficient usage of the medium. However, in V. Vishnevsky and A. I. Lyakhov, Cluster computing 5, 133-144, 2002, it is shown that these mechanisms lead to unfairness due to a seizing effect. With CSMA or CSMA/CA, before sending a message, a station tests the medium to know if it is available and to book it for sending the message afterwards. This operation is practiced by a station inside a time window called the contention window. A station that has just finished its transmission has an advantage to win the competition for the next transmission. Indeed, after a successful transmission, the CSMA or CSMA/CA algorithm prescribes that the contention window size is reset to the minimum window size. Thus, a station that has just been successful accesses the medium with a small window size and has an advantage over other stations which have not been successful recently in winning the contention. This can in turn lead to the unwanted situation that a backlogged station can monopolise the channel as it may gain exclusive access to the channel for a prolonged period of time.

This situation that occurs in standard WLANs, is experienced to an even higher degree in mesh networks. This is due to the increased density of wireless stations involved in such a mesh. Moreover, the consequences of this effect are even more serious in mesh networks than in standard WLANs and can lead to a dramatic throughput degradation as shown in S. Xu and T. Sadaawi, "Does the IEEE 802.11 MAC protocol work well in multihop wireless ad hoc networks?", IEEE Communications Magazine June 2001, p. 130-137.

For instance, let assume that a backlogged station seizes the channel, because of the seizing effect. It can then send a lot of messages to its neighbouring station downstream. However, the neighbouring station cannot access the medium to a sufficient extent, because its upstream neighbour, the backlogged station, has seized the channel. Ultimately, the neighbouring station has no other option than to drop the incoming packets as its queues start overflowing. This situation leads to performance degradation.

In the drafted standard IEEE P802.11s/D1.00, November 2006 "Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking.", the problem of congestion management is anticipated by the creation, at the MAC level, of a broadcast "Neighbourhood Congestion Announcement" and/or a unicast "Congestion Control Request". These messages use the Mesh Management frame format defined in paragraph 7.2.4.3 of the draft and are defined in the Mesh Management Action field (paragraph 7.4 and 7.3 of the draft).

However the draft does not specify the "congestion level" field nor the way this message must be used to manage congestion in the mesh network. In paragraph 11A.7 the draft describes some possible rules that can be used by a station to detect congestion: to monitor the transmission and receiving rate and the difference between these two aggregated rates, or to monitor the queue size, or a mix of both.

Upon receiving either a "Neighbourhood Congestion Announcement" or a "Congestion Control Request" message, the receiving node needs to reduce its effective MAC transmission rate accordingly by locally limiting its traffic. The local rate control mechanism may be based on dynamically adjusting EDCA parameters such as AIFSN, CWmin, or both.

SUMMARY OF THE INVENTION

It would be advantageous, in a wireless mesh network in which the CSMA/CA algorithm is used to access wireless medium, to achieve a method of congestion management, which limits or avoids the effect of unfairness in its impact on the throughput of the network.

To better address one or more concerns, in a first aspect of the invention, a method of congestion management in a wireless mesh network in which the CSMA/CA algorithm is used to access wireless medium, said network comprising a first station and at least one neighbouring station able to communicate directly with the first station, comprises:

- broadcasting an announcement message by the first station to the at least one neighbouring station when the first station experiences a congestion in its environment, said announcement message comprising a congestion level parameter,
- activating by the neighbouring station, at reception of the announcement message, a congestion state in which the minimum size of the time window, called contention window, to access the medium before transmission of a message is strictly greater than the minimum size defined in absence of congestion, said minimum size in congestion state being defined as a function of the congestion level parameter.

The method is advantageously applied to manage the contention window size and, thus, avoid the seizing effect. By receiving a congestion announcement message, a station which is monopolizing the wireless medium, has to increase the size of its contention window. Therefore, other stations in its neighbourhood have a better chance to access the wireless medium and to be able to transfer their messages.

In a particular embodiment, after having activated the congestion state, if the neighbouring station fails to transmit a packet, the neighbouring station doubles the size of the contention window before retransmitting the packet.

In another embodiment, the congestion level parameter is a congestion flag set in case of congestion, and the size of the contention window is doubled in congestion state compared to the minimum size defined in absence of congestion. And the congestion flag is unset in case of absence of congestion and the size of the contention window is reduced by two when the neighbouring station deactivates the congestion state. The first station broadcasts the announcement message when the number of collisions during transmission of packets is above a predetermined threshold. This embodiment has the advantage to be simple to implement.

In another embodiment, the congestion level parameter is a strictly positive integer, and the neighbouring station sets the size of the contention window in congestion state to two power the congestion level minus 1. And the congestion level is based on the number of announcements sent by the first station before being able to send a packet. The embodiment has the advantage to regulate more precisely the values of the window size.

In another embodiment, the congestion level parameter contains the size of the contention window to be used by the neighbouring station in congestion state. And the first station keeps track of the number of active neighbouring stations and sets the size of the contention window to approximate a transmission probability of the inverse of the number of active neighbouring stations. In this embodiment, the size of the contention window is regulated very precisely at the expense of more information to transmit through the announcement message.

In another aspect of the invention, a system of congestion management in a wireless mesh network in which the CSMA/CA algorithm is used to access wireless medium, said network comprising a first station and at least one neighbouring station able to communicate directly with the first station, comprises:

means for broadcasting an announcement message by the first station to the at least one neighbouring station when the first station experiences a congestion in its environment, said announcement message comprising a congestion level parameter, means for activating by the neighbouring station, at reception of the announcement message, a congestion state in which the minimum size of the time window, called contention window, to access the medium before transmission of a message is greater than the minimum size defined in absence of congestion, said minimum size in congestion state being defined as a function of the congestion level parameter.

In another aspect of the invention, a station in a wireless mesh network in which the CSMA/CA algorithm is used to access wireless medium, said station communicating directly with at least one neighbouring station, comprises means for broadcasting an announcement message to the at least one neighbouring station when it experiences a congestion in its environment, said announcement message comprising a congestion level parameter, said congestion level parameter being function of a number of collisions experienced by said station or of the number of announcements sent by the station before being able to send a packet.

In another aspect of the invention, a station in a wireless mesh network in which the CSMA/CA algorithm is used to access wireless medium, said station communicating directly with at least one neighbouring station, said neighbouring station being adapted to broadcast an announcement message comprising a congestion level parameter when said neighbouring station experiences a congestion in its environment, comprises means for activating, at reception of the announcement message, a congestion state in which the minimum size of the time window, called contention window, to access the medium before transmission of a message is greater than the minimum size defined in absence of congestion, said minimum size in congestion state being defined as a function of the congestion level parameter.

The invention finally relates to a computer program product directly loadable into an internal memory of a station, comprising software code portions for performing all the steps of the method of congestion management when said product is run on said station.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
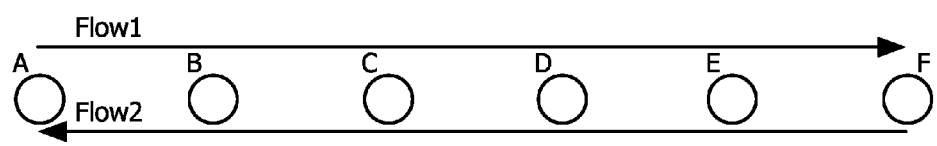
FIG. 1 is a schematic view of an exemplary mesh network in a string topology.

In reference to FIG. 1, a simple mesh network has a string topology and contains 6 nodes, or stations, referenced from A to F. The outer nodes A, F are sources and sinks of information. The inner nodes B, C, D, E are relays that route messages in the appropriate direction. Due to the topology of the mesh network, the inner nodes B, C, D, E have 2 neighbouring stations and the outer nodes A, F have only one neighbouring station B and E respectively. Consequently, the probability to experience collisions is higher for the inner stations B, C, D, E than for the outer stations A, F.

In a classical network, due to the seizing effect of the CSMA/CA algorithm, the outer nodes A, F have more occasions to seize the channel and the routing functionality of the inner nodes is hampered. At a certain level of congestion, the inner nodes are obliged to drop packets as their buffers are full of messages waiting to be transmitted and new messages continue to be push from the outer nodes.

Figure 2:
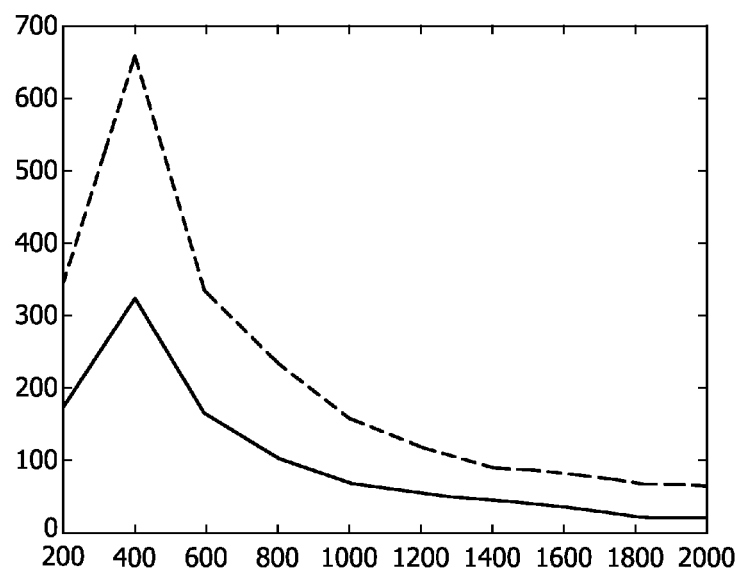
FIG. 2 is a diagram of the throughput as a function of the traffic load in a classical network.

The effect on the throughput of the classical network is illustrated in FIG. 2 with a rapid decline of the throughput when the traffic load increases above approximately 400.

According to an embodiment of the invention, the nodes are modified to be able to send an announcement message when they experience a congestion situation and to modify the size of their contention window at reception of such an announcement message.

Figure 3:
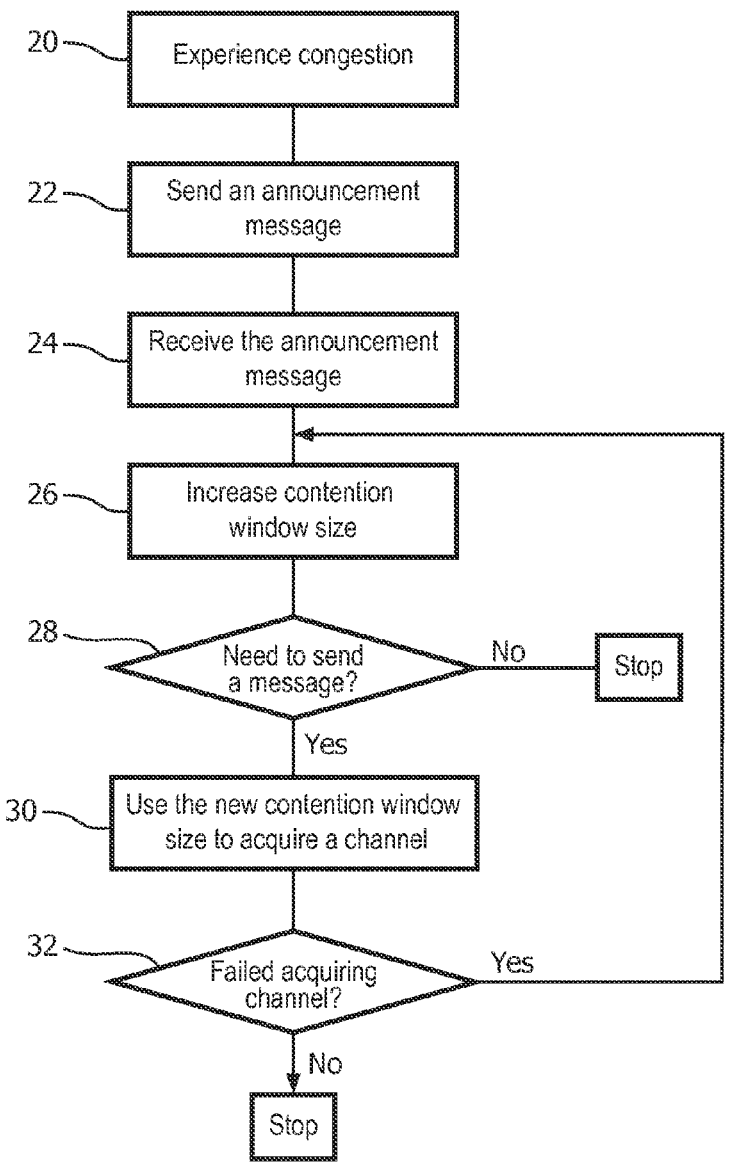
FIG. 3 is a schematic view of the operation of the network according to an embodiment of the invention.

Therefore, the operation of the network is the following, FIG. 3.

A node, for instance the node B, experiences a state of congestion in its neighbourhood, step 20.

The definition of a state of congestion is based on different criteria:
- the number of collisions is above a predetermined threshold;
- the number of active stations, i.e. stations transmitting messages; and/or
- a model of operation based on observables such as the prediction analysis described by G. Bianchi, "Performance analysis of the IEEE 802.11 Distributed coordination function", IEEE JSAC, Vol. 18, no 3, pp. 535-547, March 2000.

The node B sends, step 22, an announcement message to its neighbouring nodes A, C to inform them it is experiencing a state of congestion. The announcement message comprises a congestion level parameter.

At step 24, nodes A, C receive the announcement message and increase, step 26, the size of the contention window. The new size of the contention window is function of the congestion level parameter.

If, at step 28, node A or node C needs to send a message, it uses the new contention window size to acquire the channel at step 30. And, classically, if the acquisition of the wireless medium fails, the node doubles, at step 32, the contention window size before trying again.

By increasing the size of the contention window, the seizing effect is advantageously reduced or suppressed.

A successful station cannot anymore monopolize the wireless medium. As the minimum contention window become larger, the advantage of a successful station is diminished as compared to the other stations.

Another advantage is the reduced variability of the minimum contention window size of the stations of the mesh network which leads to a better fairness. If the minimum contention window size is increased, and not too small, there is a reduced need to counteract small contention window size with large contention window size.

Another advantage of the reduced variability is the increase of the throughput in the network as shown by Bianchi in the here above referenced document.

The format of the announcement message, i.e. the congestion level parameter, varies and depends of the type of chosen signalling.

In a first embodiment, the state of congestion is signalled by only one bit. When the bit is set, a state of congestion is signalled and when the bit is unset, there is no state of congestion.

When a state of congestion is signalled, all neighbouring stations double their minimum contention window size and, similarly, when the announcement message has its bit unset, the neighbouring stations divide by two their minimum contention window size.

This embodiment has the advantage of simplicity. A potential drawback of this method of signalling is that stations may receive different number of announcement messages and end up with different values for the minimum contention window size, which creates unfairness and limit the effectiveness of the embodiment.

In a second embodiment, the state of congestion is signalled as an integer defining a congestion level. The congestion level is set at 1 for a non-congestion state and increases with the congestion. For instance, the congestion level is defined as the number of active neighbouring stations. At reception of the congestion level, the stations define the minimum size of the contention window as the minimum size in absence of congestion times two power the congestion level minus 1, or where CWcong is the minimum size defined for congestion, CWmin is the minimum size in absence of congestion and M is the congestion level propagated by the announcement message.

In this embodiment, more bits are needed to transmit the congestion level in the announcement message. However, this embodiment has the advantage to maintain a common size of the contention window for all the neighbouring stations. Consequently, the network moves faster, i.e. with a lesser amount of congestion announcement message, to a state in which all stations share the desired minimum contention window size.

In a third embodiment, the announcement message contains directly the minimum size of the contention window to be used by the neighbouring stations. This embodiment has the advantage to allow a fine-grained control of the size of the contention windows at the expense of more space to transport the size in the announcement message. This embodiment is also deviating of the current practice in which the contention window size doubles upon collisions.

While the invention has been illustrated and described in details in the drawings and foregoing description, such illustration and description are to be considered illustrative or exemplary and not restrictive; the invention is not limited to the disclosed embodiment.

Other variations to the disclosed embodiments can be understood and effected by those skilled on the art in practising the claimed invention, from a study of the drawings, the disclosure and the appended claims. In the claims, the word "comprising" does not exclude other elements and the indefinite article "a" or "an" does not exclude a plurality.

The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of congestion management in a wireless mesh network in which CSMA/CA algorithm is used to access a wireless medium, said network comprising a first station and at least one neighbouring station able to communicate directly with the first station, comprising:
   broadcasting an announcement message by the first station to the at least one neighbouring station when the first station experiences a congestion in its environment, said announcement message comprising a congestion level parameter,
   activating by the at least one neighbouring station at reception of the announcement message a congestion state, in which a minimum size of a time window is called a contention window, to access the wireless medium before transmission of a message is strictly greater than the minimum size defined in absence of congestion, said minimum size in the congestion state being defined as a function of the congestion level parameter,
   wherein the congestion level parameter contains the size of the contention window to be used by the at least one neighbouring station in the congestion state, and
   wherein the first station keeps track of the number of active neighbouring stations and sets the size of the contention window to approximate a transmission probability of the inverse of the number of active neighbouring stations.

2. The method according to claim 1, wherein, after having activated the congestion state, if the at least one neighbouring station fails to transmit a packet, the at least one neighbouring station doubles the size of the contention window before retransmitting the packet.

3. The method according to claim 1, wherein the congestion level parameter is a congestion flag set in case of congestion, and the size of the contention window is doubled in the congestion state compared to the minimum size defined in absence of congestion.

4. The method according to claim 3, wherein the congestion flag is unset in case of absence of congestion and the size of the contention window is reduced by two when the at least one neighbouring station deactivates the congestion state.

5. The method according to claim 3, wherein the first station broadcasts the announcement message when the number of collisions during transmission of packets is above a predetermined threshold.

6. The method according to claim 1, wherein the congestion level parameter is a strictly positive integer, and the at least one neighbouring station sets the size of the contention window in the congestion state to two power the congestion level minus 1.

7. The method according to claim 6, wherein the congestion level is based on the number of announcements sent by the first station before being able to send a packet.

* * * * *